US007676304B2

(12) United States Patent
Colich

(10) Patent No.: US 7,676,304 B2
(45) Date of Patent: Mar. 9, 2010

(54) PROCEDURE TO MINIMIZE THE RISK OF MID-AIR COLLISION FOR PERSONAL AIR VEHICLES

(75) Inventor: Joseph M. Colich, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/117,066

(22) Filed: May 8, 2008

(65) Prior Publication Data

US 2009/0099712 A1 Apr. 16, 2009

Related U.S. Application Data

(62) Division of application No. 11/061,704, filed on Feb. 17, 2005, now Pat. No. 7,389,163.

(51) Int. Cl.
*G05D 1/04* (2006.01)
*G08G 7/02* (2006.01)
*G08G 5/04* (2006.01)

(52) U.S. Cl. .......................................... 701/8; 701/121

(58) Field of Classification Search ...................... 701/8
See application file for complete search history.

(56) References Cited

U.S. PATENT DOCUMENTS 2,454,423 A 11/1948 Baak
2,825,054 A 2/1958 Ernst
3,031,658 A * 4/1962 Green et al. .................. 342/34
3,868,497 A 2/1975 Vietor
3,916,688 A * 11/1975 Dendy et al. ............... 73/178 T
3,998,412 A 12/1976 Baker et al.
4,021,009 A 5/1977 Baker et al.
4,453,154 A 6/1984 Rait et al.
4,706,198 A 11/1987 Thurman
4,827,418 A 5/1989 Gerstenfeld
4,939,513 A 7/1990 Paterson et al.
5,001,476 A 3/1991 Vermillion et al.
5,075,685 A * 12/1991 Vermilion et al. ........... 340/970
5,153,588 A 10/1992 Muller
5,220,322 A 6/1993 Bateman et al.
5,225,829 A 7/1993 Bateman
5,574,647 A 11/1996 Liden
5,716,032 A * 2/1998 McIngvale .................. 244/185

(Continued)

OTHER PUBLICATIONS

Pending U.S. Appl. No. 11/061,704, filed Feb. 17, 2005, titled: A Procedure to Minimize the Risk of Mid-Air Collision for Personal Air Vehicles, Inventor: Joseph M. Colich.

*Primary Examiner*—Thomas G Black
*Assistant Examiner*—Shelley Chen
(74) *Attorney, Agent, or Firm*—Rozenblat IP LLC

(57) ABSTRACT

A method of and a system for controlling personal air vehicle (PAV) traffic provides a take-off-and-landing zone, and a forward flight zone. The take-off-and-landing zone may be from the ground up to a first altitude. The forward flight zone may be from the first altitude up to a second altitude. A maximum airspeed is provided in the take-off-and-landing zone. Minimum and maximum airspeeds are provided in the forward flight zone. In the forward flight zone there is a single heading for each altitude. Any change in heading must be accompanied by a change in altitude.

7 Claims, 7 Drawing Sheets

U.S. PATENT DOCUMENTS

| | | | | |
|---|---|---|---|---|
| 5,884,222 | A * | 3/1999 | Denoize et al. | 701/301 |
| 6,505,102 | B2 * | 1/2003 | Morizet et al. | 701/3 |
| 7,124,027 | B1 | 10/2006 | Ernst et al. | |
| 2003/0048203 | A1 | 3/2003 | Clary et al. | |
| 2005/0015202 | A1 | 1/2005 | Poe et al. | |
| 2005/0128129 | A1 | 6/2005 | Conner et al. | |
| 2005/0192739 | A1 | 9/2005 | Conner et al. | |
| 2006/0025898 | A1 * | 2/2006 | Charles | 701/3 |
| 2007/0043481 | A1 | 2/2007 | Metschan et al. | |
| 2007/0120708 | A1 * | 5/2007 | Ishihara et al. | 340/963 |

* cited by examiner

| ALTITUDE (ft) | AIRSPEED (ft/s) |
|---|---|
| 0 - 200 | 0 - 36 |
| 200 - 1000 | 36 - 144 |

PROCEDURE TO MINIMIZE THE RISK OF MID-AIR COLLISION FOR PERSONAL AIR VEHICLES

CROSS-REFERENCE TO RELATED APPLICATION

This application claims priority to and is a divisional of U.S. patent application Ser. No. 11/061,704 filed Feb. 17, 2005, which is hereby incorporated by reference.

BACKGROUND OF THE INVENTION

The present invention provides a flight control method and system, and more particularly a method of and system for minimizing the risk of mid-air collisions between personal air vehicles.

Currently, particularly in areas of the country where the majority of people are unable or unwilling to use public transportation, the automobile is the mode of choice for personal point-to-point transportation. Every day, millions of people in urban areas use automobiles to commute to and from work. Typically, a commute involves driving on surface streets and roads from home to a freeway system, driving on the freeway system to an off-ramp near a destination, and driving on surface streets or roads to the destination.

The current system of roads and freeways is expensive. Roads and freeways are expensive to build and maintain. With the growth of population and the economy, more people use the existing road and freeway systems every year. Roads and freeways quickly become clogged with traffic. Accordingly, federal, state, and local governments are continually planning and building new roads and freeways.

The current system of roads and freeways is also somewhat inefficient. Automobiles are constrained to travel on the roads; thus, they are not able to take the most direct route to a destination. Also, to facilitate safe travel on surface streets, traffic lights and stop signs limit the flow of traffic. Commuting tends to be a slow and frustrating process.

For at least fifty years, people have talked and dreamed about personal air vehicles (PAVs) as an alternative to automobiles for personal transportation. A PAV is a small, relatively low-performance aircraft. A number of configurations have been suggested over the years, such as automobiles with folding or detachable wings, and various vertical-take-off-and-landing (VTOL) configurations. Until recently, the concepts and designs for PAVs have been the province of independent inventors and small businesses. However, recently the government, large industries and educational institutions are investing substantially in the development of PAVs. It is likely that PAVs will become a reality.

In order for PAVs to become a viable alternative to automobiles, it is necessary that the qualifications and rules for operating PAVs be similar to those for automobiles. For example, obtaining a license to operate a PAV should not be significantly more difficult than obtaining a driver's license. Operators of PAVs will be of all ages and skill levels. Most operators will not have the skill and training of qualified airplane pilots. In order to accommodate the abilities of most operators, PAVs will be capable of flying at very low speeds and incapable of flying at high speeds. Most likely, PAV will have VTOL capabilities.

Because of the number of PAVs and the number of potential take-off-and-landing points, there will be no air traffic controllers. Rather, there must be a relatively simple and intuitive set of rules by which individual operators operate their PAVs. Any instrumentation should be simple and not confusing to the average operator.

BRIEF SUMMARY OF THE INVENTION

The present invention provides a method of and a system for controlling personal air vehicle (PAV) traffic to reduce the risk of mid-air collisions between PAVs. In one embodiment, the method of the present invention establishes a take-off-and-landing zone, and a forward flight zone. The take-off-and-landing zone may be from the ground up to a first altitude. The forward flight zone may be from the first altitude up to a second altitude. An example of a first altitude range is two hundred feet above the ground. An example of the second altitude is one thousand feet above the ground. Thus, a PAV between zero and two hundred feet above the ground is in the take-off-and-landing zone. A PAV between two hundred feet and one thousand feet above the ground is in the forward flight zone.

The method of the present invention establishes a maximum airspeed in the take-off-and-landing zone. The method further establishes a minimum airspeed and a maximum airspeed in the forward flight zone. The method maintains traffic separation in the forward flight zone by establishing for each heading a single altitude, or a single heading for each altitude. Thus, PAVs at the same altitude will be on the same heading. PAVs on different headings will be at different altitudes.

The heading-altitude relationship may be established by assigning an arbitrary initial heading to the first altitude, which forms the boundary between the take-off-and-landing zone and the forward flight zone. An example of an initial heading is 045° magnetic. The slope of the altitude versus heading curve is equal to the difference between the second altitude, which is the upper limit of the forward flight zone, and first altitude, divided by three hundred sixty degrees. In the example in which the forward flight zone is from two hundred feet to one thousand feet, slope of the altitude-heading curve is about 2.22 feet per degree. In one embodiment of the present invention, the slope of the altitude-heading curve is positive, so that headings to the right of the initial heading have assigned thereto higher altitudes.

Since there is a single altitude for each heading, any change in heading must be accompanied by a change in altitude. In the embodiment in which the slope of the altitude-heading curve is positive, turns to the right must be accompanied by an increase in altitude; turns to the left must be accompanied by a decrease in altitude. The rate of increase or decrease in altitude must be at the slope of the altitude-heading curve.

Because of the altitude-heading traffic separation scheme according to the present invention, occasions for mid-air collisions between PAVs flying at constant headings and altitude in the forward flight zone will be rare. However, an embodiment of the present invention may provide rules defining the right of way. In passing situations, in which a faster moving PAV is overtaking a slower moving PAV, the overtaking PAV must take action to avoid colliding with the overtaken PAV. According to one embodiment, if the heading of the overtaking PAV is from 0 to 20° to the right of the heading of the overtaken PAV, overtaking PAV must turn to the right and ascend to an altitude that will ensure a predetermined altitude separation between the PAVs. If the heading of the overtaking PAV is from 0 to 20° to the left of the heading of the overtaken PAV, overtaking PAV must left to the right and descend to an altitude that will ensure the predetermined altitude separation between the PAVs.

In situations in which two PAVs are flying at similar speeds on slightly non-parallel straight-line headings, neither PAV can be said to be overtaking the other. However, they may have a small relative velocity toward each other that may result in a collision unless one of the PAVs changes heading or speed. In those situations, the PAV that has the other on its right must take action to avoid collision.

There is a risk of collision between two PAVs when one or both of them may be turning. Turning PAVs change altitude as well as heading. During a turn, one PAV may ascend or descend into the path of another PAV. In an embodiment of the present invention, the risk of collision may be lessened by limiting the maximum speed of the PAV making a substantial heading change. A PAV that is making a heading change may also be required to emit a short range signal to alert PAVs in its vicinity prior to changing heading and altitude.

An embodiment of a system according to the present invention may include an altitude sensor, such as a radar altimeter or a laser range finder directed at the ground, a heading sensor or compass, and an airspeed sensor. A processor coupled to the sensor is programmed with personal air vehicle flight control rules. A suitable display is coupled to the processor. The system may include a user input device, audio or visual alarms, and a turn signal transmitter.

DETAILED DESCRIPTION OF THE INVENTION

Figures 1, 3:
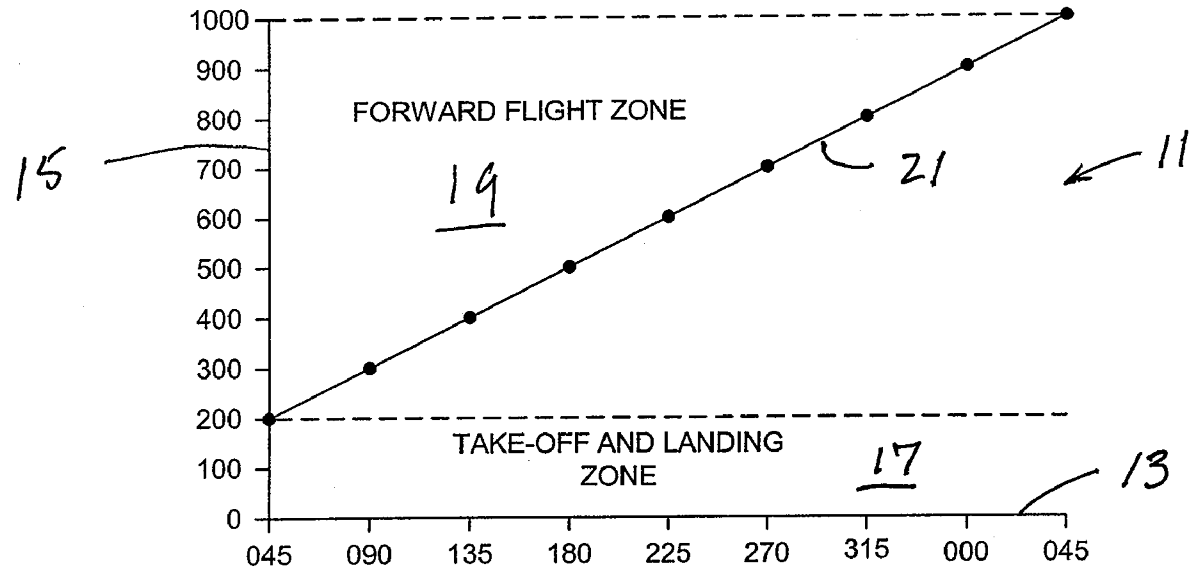
FIG. 1 is a graphical depiction of a take-off-and-landing zone, a forward flight zone, and a heading-altitude relationship according to an embodiment of the present invention.
FIG. 3 is a table of maximum and minimum airspeeds according to an embodiment of the present invention.

Referring now to the drawings, and first to FIG. 1, a graphical representation of features of an embodiment of the present invention is designated generally by the numeral 11. Graphical representation 11 includes a heading axis 13 and an altitude axis 15. The units in heading axis 13 are degrees magnetic, although the units could be degrees true. The heading for the origin is selected to be 045° magnetic, although other headings could be used at the origin. The units of altitude axis 15 are feet above the ground. At the origin, the altitude is 0, or the surface of the ground.

Graphical representation is divided into a take-off-and-landing zone 17 and a forward flight zone 19. Take-off-and-landing zone 17 extends from the surface of the ground to an altitude of 200 feet above the surface of the ground. Forward flight zone 19 extends from an altitude of 200 feet above the ground to an altitude of 1000 feet above the ground. In the embodiment of FIG. 1, 1000 feet above the ground is the upper limit of altitude according the present invention. The lower limit of 200 above the ground is selected so that PAVs in forward flight will be above most buildings, trees, and towers. Special rules may be set in areas with very tall buildings. The upper limit of 1000 feet above the ground is selected so that PAVs will be below general aviation traffic. It will be recognized that other altitudes may be chosen to define the take-off-and-landing zone and the forward flight zone. PAVs that are capable of flying above the upper altitude limit may do so, but their operation is subject to the rules for general aviation when they are at an altitude greater than 1000 feet above the ground.

As shown in FIG. 1, for each heading in forward flight zone 19, there is a unique altitude. The relationship between heading and altitude is graphically represented by an altitude-heading curve 21. In the embodiment of FIG. 1, the altitude intercept of altitude-heading curve 21 is 200 feet above the ground. Accordingly, the initial heading when entering or leaving forward flight zone 19 is 045° magnetic. The altitude associated with a heading of 135° magnetic is 400 feet above the ground. Thus, PAVs on perpendicular courses will separated by at least 200 feet in altitude. The altitude associated with a heading of 225° magnetic is 600 feet above the ground. Thus, PAVs on opposite headings will be separated by 400 feet in altitude. PAVs at the same or similar altitudes will be on the same or similar headings and, accordingly, will have relatively low relative airspeeds with respect to each other.

A consequence of the relationship of heading to altitude according to the present invention is that any change of heading in forward flight zone 19 must be accompanied by a change in altitude. In the example of FIG. 1, a turn to the right must be accompanied by an increase in altitude. Similarly, a turn to the left must be accompanied by a decrease in altitude. The rate of descent or ascent during turns is defined by the slope of altitude-heading curve 21, which is equal to the change altitude divided by the change in heading. In the example of FIG. 1, for turn of 360°, the change in altitude is 800 feet. Accordingly, the slope of altitude-heading curve 21, or rate of ascent or descent during a turn, is about 2.22 feet of altitude per degree of heading change.

In the invention as described with reference to FIG. 1, the slope of heading-altitude curve is positive. It should be recognized that the slope could be negative, such that altitude increases with heading changes toward the left and decreases with heading changes toward the right. Also, in the invention described with reference to FIG. 1, heading-altitude curve 21 is a straight line. There may be a nonlinear relationship between heading and altitude so long as there is only one altitude for any heading.

Figure 2A:
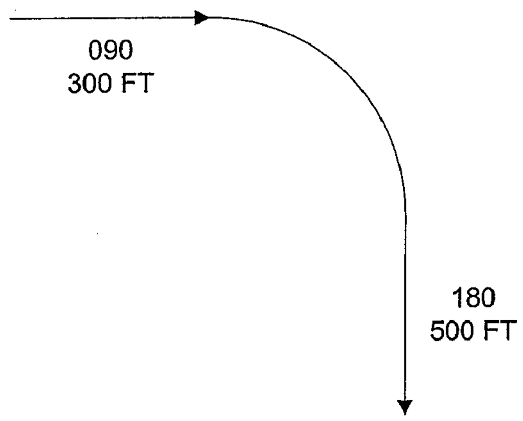
FIGS. 2A-2C illustrate examples of flight paths for turns according to an embodiment of the present invention.
Figure 2B:
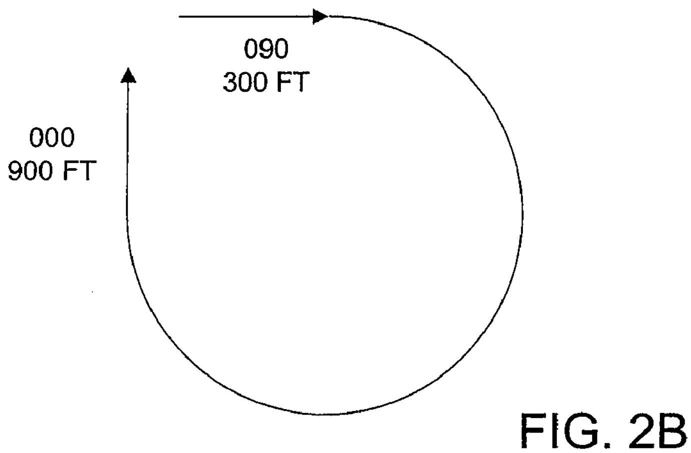
Figure 2C:
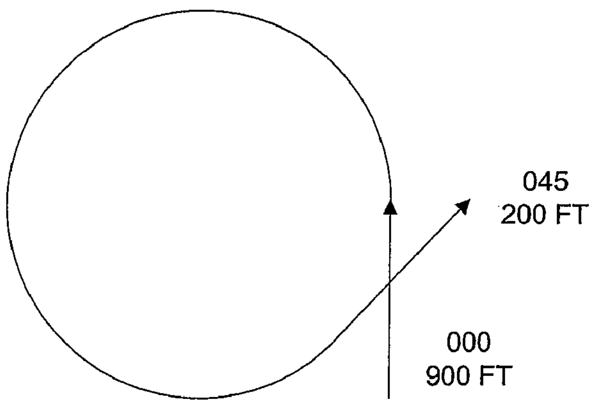

Examples heading and altitude changes are illustrated in FIGS. 2A-2C. FIG. 2A illustrates a positive 90° heading change from 090° magnetic to 180° magnetic. According to conventions described with reference the FIG. 1, the turn must be toward the right and it must be accompanied by a 200 foot increase in altitude from 300 feet above the ground to 500 feet above the ground. Figure BB illustrates a negative 90° heading change from 090° magnetic to 000° magnetic. Since the altitude associated with the final heading is higher than that associated with the initial heading, the turn must be to the right. Accordingly, a PAV must execute a turn of 270° to the right and ascend to 600 feet on a helical path to an altitude of 900 feet above the ground. FIG. 2C illustrates a 45° positive heading change from 000° magnetic to 045° magnetic to exit the forward flight zone. Since the altitude associated with the final heading is lower than that associated with the initial heading, the turn must be to the left. Thus, a PAV must execute a turn of 315° to the left and descend 700 feet on a helical path from 900 feet above the ground to 200 feet above the ground. Although, it may appear to be inefficient or inconvenient to require a PAV to execute a turn of more than 180° to make a heading change of less than 180°, any inconvenience or inefficiency as made up for by the decreased risk of mid-air collision afforded by the present invention.

It is contemplated that PAVs will be capable of vertical take-off and landing. Accordingly in the embodiment of FIG. 1, in take-off-and-landing zone 17, PAVs will ascend from the ground to an altitude of 200 feet above the ground to enter forward flight zone 17 and descend from 200 feet to the ground for landing substantially vertically. No altitude-heading relationship is specified in take-off-and-landing zone 17. Thus, in the take-off-and-landing zone, a PAV may assume any heading. However, when entering or leaving the forward flight zone, the PAV must be on a heading of 045° magnetic.

An embodiment of the present invention imposes speed limits, set out tabular form in FIG. 1, in take-off-and-landing zone 17 and forward flight zone 19. In FIG. 3, there are an altitude column 23 and an airspeed column 25. In each zone, there is specified a minimum airspeed and a maximum airspeed. In the take-off-and-landing zone, which comprises altitudes from 0 to 200 feet above the ground, the minimum airspeed is 0 and the maximum airspeed is 36 feet per second, which slightly less than 25 miles per hour. In the forward flight zone, which comprises altitudes from 200 to 1000 feet above the ground, the minimum airspeed is 36 feet per second and the maximum airspeed is 144 feet per second, which is slightly less than 100 miles per hour.

In addition to the speed limits of FIG. 3, there may be a maximum speed for turns in the forward flight zone. The maximum speed may be set only for turns larger than a certain amount, so that small heading changes may be made without reducing speeds. For example, a maximum speed of 50 feet per second, which is about 35 miles per hour, may be required for turn of more than 20°.

Since a PAV is required to change its altitude whenever it changes its heading, the rate of turn is limited by the performance of a PAV, and particularly the rate at which the PAV can climb. The parametric equation of a helix is:

$$\bar{S}(\theta) = (r\mathrm{Cos}(\theta))\hat{\imath} + (r\mathrm{Sin}(\theta))\hat{\jmath} + \left(\frac{400}{\pi}\right)\theta\hat{k}$$

where 400/π is the pitch of the helix, r is the radius of the helix, θ is the angular position in radians, and i, j, and k are unit vectors.

If: θ=ωt where ω is the angular rate of heading change and t is time, then $$\bar{S}(\theta) = (r\mathrm{Cos}(\omega t))\hat{\imath} + (r\mathrm{Sin}(\omega t))\hat{\jmath} + \left(\frac{400}{\pi}\right)\omega t\hat{k}$$

Differentiating with respect to time to get velocity yields:

$$\frac{d\bar{S}}{dt} = (-r\omega\mathrm{Sin}(\omega t))\hat{\imath} + (r\omega\mathrm{Cos}(\omega t))\hat{\jmath} + \left(\frac{400}{\pi}\right)\omega\hat{k}$$

Differentiating again with respect to time yields acceleration:

$$\frac{d^2\bar{S}}{dt^2} = (-r\omega^2\mathrm{Cos}(\omega t))\hat{\imath} - (r\omega^2\mathrm{Sin}(\omega t))\hat{\jmath}$$

Since speed is the magnitude of velocity:

$$\left|\frac{dS}{dt}\right| = \sqrt{r^2\omega^2\mathrm{Sin}^2\omega t + r^2\omega^2\mathrm{Cos}^2\omega t + \left(\frac{400}{\pi}\right)^2\omega^2}$$

Simplifying yields:

$$\left|\frac{dS}{dt}\right| = \sqrt{r^2\omega^2 + \left(\frac{400}{\pi}\right)^2\omega^2} = \omega\sqrt{r^2 + \left(\frac{400}{\pi}\right)^2}$$

Similarly the magnitude of acceleration is $$|a| = r\omega^2$$

The speed and acceleration magnitude equations above must be solved simultaneously for r, the radius of turn, and ω, the rate of heading change. If the maximum Rate of Climb (ROC) for a given PAV is low, for example <15 ft/s, the turn radius will be large unless the pilot decreases speed. If the speed during a heading change is to be 35 ml/hr, and letting the acceleration limit to be 0.15 g=4.83 ft/s$^2$, ω and r are found to be 0.097 rad/s (about 6 degrees per second) and 514 ft respectively. This radius is large and at about the upper bound. An 800 foot altitude change corresponding to a 359.99 degree heading change (θ=2π) would take 64.8 seconds and the rate of climb would be 12.3 ft/s. PAVs capable of a ROC of >29 ft/s (and letting |a|=0.3) could make the heading change with a radius <200 ft.

It should be recognized that the specific airspeed limits described herein are merely examples. The airspeed limits of FIG. 2 were selected by estimating the reflexes, reaction time, coordination, eyesight, skill level, etc. of a minimally qualified PAV operator. The airspeed limits may be set higher or lower. As illustrated in FIG. 2, the maximum airspeed in the take-off-and-landing zone may be about the same as the minimum airspeed in the forward flight zone so that the PAV can make a smooth and safe transition between zones.

It is apparent that the method as thus far described reduces the likelihood of collisions in the forward flight zone between PAVs on substantially different headings. However, there is a risk of rear-end collisions between faster moving PAVs and slower moving PAVs flying on substantially the same heading at substantially the same altitude above the ground. There is also some risk of low relative speed collisions or near misses between PAVs flying on slightly non-parallel headings at about the same altitude above the ground. Additionally, there is a risk of collision whenever a PAV is making a substantial heading change. During a heading change, a PAV may ascend or descend into the path of another PAV. In order to minimize these risks of collision, the method of the present invention may provide rules for avoiding such collisions.

Figure 4A:
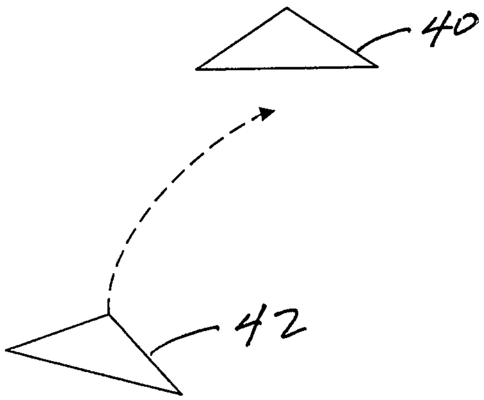
FIGS. 4A-4C illustrate overtaking and potential collision situations according to an embodiment of the present invention.

A first overtaking situation is illustrated in FIG. 4A, in which a first PAV 40 is flying on a heading of 000° magnetic, at an altitude of 900 feet above the ground, and at an airspeed of 50 miles per hour. A second PAV 42, flying on a heading of 005° magnetic, at an altitude of about 911 feet above the ground, and at an airspeed of 100 miles per hour, is rapidly closing on first PAV 41. Although there will be eleven feet of altitude separation between PAV 40 and PAV 42, an embodiment of the present invention requires overtaking an PAV on a heading to the right of the overtaken PAV's heading to change course so as to pass behind the overtaken PAV with an altitude separation of at least forty-five feet above the overtaken PAV. Accordingly, PAV 42 must turn right to a heading of about 020° magnetic and ascend to an altitude, of about 945 feet above the ground.

Figure 4B:
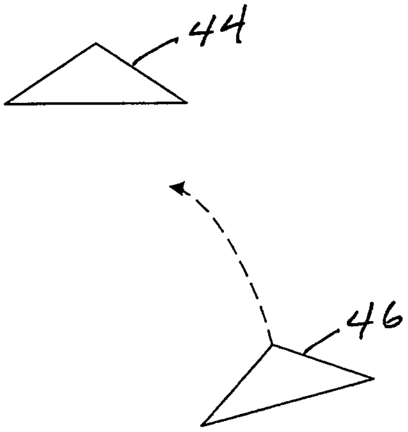

A second overtaking situation is illustrated in FIG. 4B, in which a first PAV 44 is flying on a heading of 000° magnetic, at an altitude of 900 feet above the ground, and at a speed of 50 miles per hour. A second PAV 46, flying on a heading of 355° magnetic, at an altitude of about 889 feet above the ground, and at a speed of 100 miles per hour, is rapidly closing on first PAV 44. An embodiment of the present invention requires an overtaking PAV on a heading to the left of the overtaken PAV's heading to change course so as to pass behind the overtaken PAV with an altitude separation of at least forty-five feet below the overtaken PAV. Accordingly, PAV 46 must turn left to a heading of about 340° magnetic and descend to an altitude of about 855 feet above the ground.

Figure 4C:
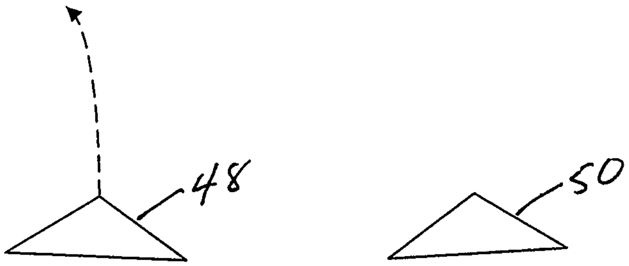

An example of a non-overtaking potential collision situation is illustrated in FIG. 4C, in which a first PAV 48 is flying on a heading of 001° magnetic, at an altitude of about 902 feet above the ground, and at an airspeed of about 90 miles per hour. A second PAV 50 is flying on a heading of heading of 359° magnetic, at an altitude of about 898 feet above the ground, and at an airspeed of about 90 miles per hour. PAV 48 and PAV 50 are separated by 90 feet, but they are closing on each other at a rate of about 4.5 feet per second. Thus, if both PAVs continue on their respective courses and speeds, they will collide or narrowly miss each other in about twenty seconds. According to an embodiment of the present invention, in such situations, the PAV having the other on its right hand side must avoid collision. Thus, PAV 48 must by change heading (and altitude) and/or speed.

There is a risk of collision when a PAV is making a large heading change. Since in one embodiment of the present invention, a PAV making a turn of greater than twenty degrees is required to slow to an airspeed thirty-five miles per hour, most PAVs flying on straight courses will be traveling substantially faster than the turning PAV. Accordingly, a PAV flying on a straight course will see the turning PAV in front of them and will effectively be in a passing situation with the turning PAV.

Figure 5A:
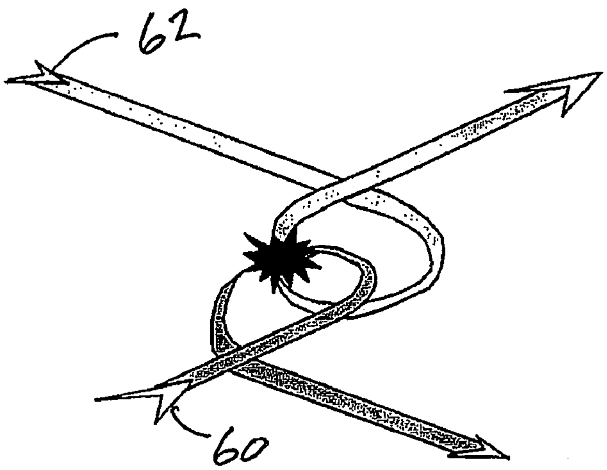
FIGS. 5A and 5B illustrate collision avoidance during turns according to an embodiment of the present invention.

The risk of collision may be greater between two PAVs when each is making a large turn. Such a situation is illustrated in FIG. 5A, which a first PAV 60 is changing heading from 000° magnetic at 900 feet to 090° magnetic at 300 feet. Substantially simultaneously, a second PAV 62 is changing heading from 090° magnetic at 300 feet to 000° magnetic at 900 feet. As shown in FIG. 5A, approximately midway through their respective heading changes, PAV 60 and PAV 62 collide with each other around an altitude of 600 above the ground.

Figure 5B:
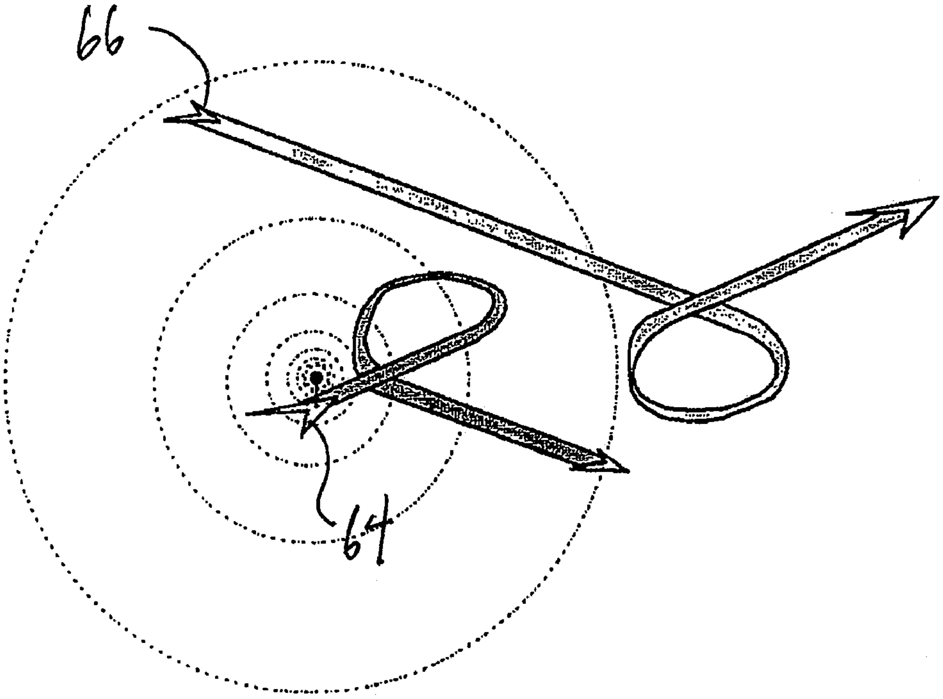

FIG. 5B illustrates a collision avoidance feature according to an embodiment of the present invention. A first PAV 64 is preparing to change heading from 000° magnetic at 900 feet to 090° magnetic at 300 feet. Before starting its turn, PAV 64 starts broadcasting a radio turn signal indicated by concentric circles in FIG. 5B. Preferably, the radio turn signal is of short range. An example of a range for the radio turn signal is twice the radius of the turn required for the heading change. The radius of turn may be calculated according the equations of speed and acceleration, above. Operators of PAVs that receive the radio turn signal will be alerted that a PAV is changing heading. Operators of nearby PAVs will be on the lookout for the turning PAV and will maintain a straight course and not change heading until they no longer hear the turn signal. Thus, a second PAV 66, which intends to change heading from 090° magnetic at 300 feet to 000° magnetic at 900 feet, will maintain its heading and not start its heading change until PAV 64 has completed its turn.

Figure 6:
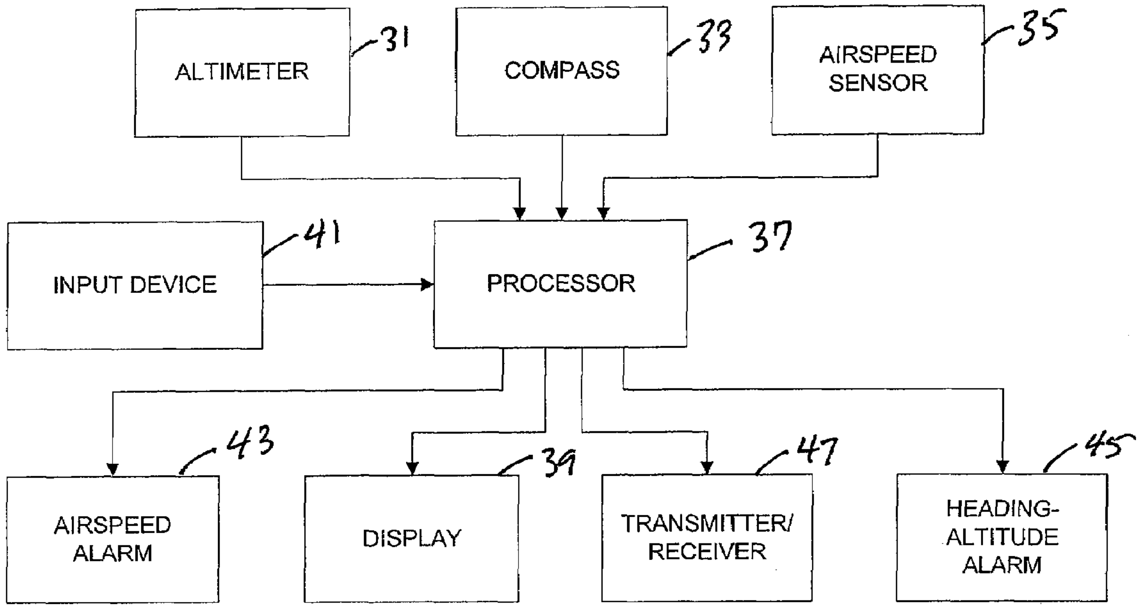
FIG. 6 is a block diagram of an embodiment of a system according to the present invention.

FIG. 6 is a block diagram of an embodiment of a PAV flight control instrumentation system according to the present invention. The system includes an altitude sensor 31, a direction sensor 33, and an airspeed sensor 35. Since in the illustrated embodiment of the present invention the altitudes are measured with respect to the ground rather than sea level, altitude sensor 31 may be a radar altimeter, laser range finder, or similar device, that produces a digital distance to the ground. Direction sensor 33 may be a magnetic compass that is adapted to produce a digital heading reading. Airspeed sensor 35 may be a Pitot tube sensor that produces a digital airspeed reading. Those skilled in the art will recognize that alternative sensors and instruments may be used.

Sensors 31-35 are coupled to a processor 37 that is programmed to make calculations and provide information to a PAV operator according to the present invention based upon the signals received from the sensors. Processor 37 may be coupled to a suitable display device 39, such as a liquid crystal display. Processor may be coupled to an input device 41 that enables an operator to provide information, such a proposed new heading, to processor 37. User input device 41 may be an electromechanical device or it may be combined with display 39, using touch screen or pen-based technology.

Processor 37 may be coupled to an airspeed alarm 43 and/or a heading-altitude alarm 45. Airspeed alarm 43 may provide an audio and/or visual alarm when the PAV's airspeed is outside the limits of FIG. 3. Airspeed alarm 43 may provide separate indications when the airspeed is too fast or too slow. Similarly, heading-altitude alarm 45 may provide an audio and/or visual alarm when the PAV is not at the proper altitude for its heading, according to FIG. 1. Heading-altitude alarm 45 may provide separate indications when the PAV is too high or too low for its current heading.

Processor 37 may also be coupled to transmitter 47 adapted to transmit a turning signal. Transmitter 47 may be part of a two-way radio that includes a receiver so that the operator of the PAV can hear turning signals transmitted by other PAVs.

Figure 7:
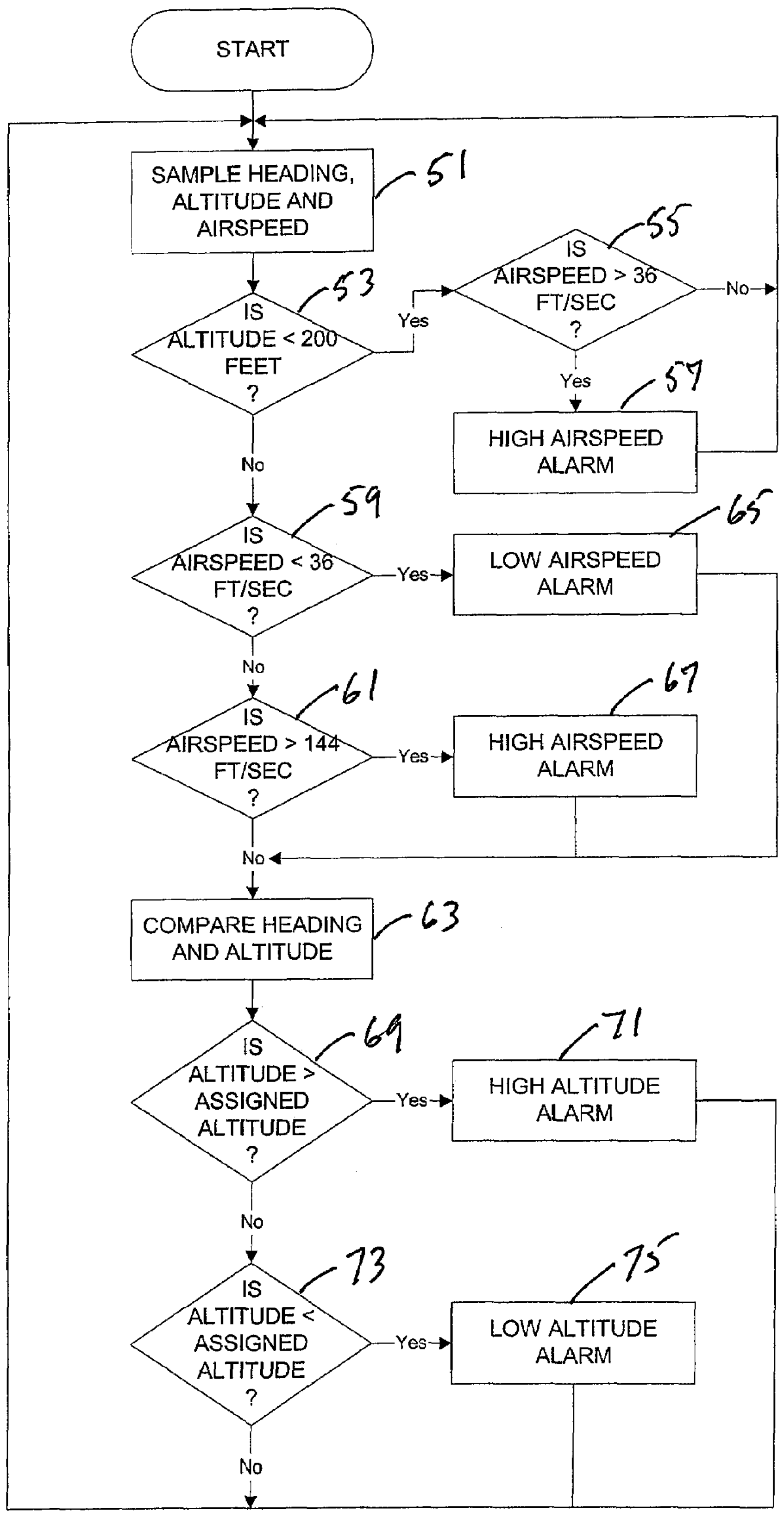
FIG. 7 is a flowchart of heading, altitude and airspeed processing of an embodiment of a system according to the present invention.

Referring now to FIG. 7, there is shown a flowchart of an embodiment of heading, altitude and airspeed processing according to the present invention. The system samples heading, altitude, and airspeed signals from the sensors of FIG. 6, as indicated at block 51. The system may include some averaging of samples in order to decrease the effects of abrupt or transient changes in the sensed parameters. The system determines, at decision block 53, if the altitude is less than 200 feet above the ground. If so, the system determines, at decision block 55, if the airspeed is greater than 36 feet per second. If so, the system activates a high airspeed alarm, at block 57, and processing returns to block 51.

If, as determined at decision block 53, the altitude is not less than 200 feet, which indicates that the PAV is in the forward flight zone, the system determines, at decision block 59, if the airspeed is less than 36 feet per second. If not, the system determines, at decision block 61, if the air speed is greater than 144 feet per second. If not, the system compares the heading and altitude to the values prescribed in FIG. 1, at block 63.

Returning to decision block 59, if the system determines that the airspeed is less than 36 feet per second, the system actuates a low airspeed alarm, at block 65, and processing continues at block 63. If the system determines that the airspeed is greater than 144 feet per second, at decision block 61, the system actuates the high airspeed alarm, at block 67, at processing continues at block 63.

After comparing performing the comparison of block 63, the system determines if the altitude is greater than the altitude assigned for the heading according to FIG. 1, at decision block 69. If so, the system actuates a high altitude alarm, at block 71, and processing returns to block 51. If the system determines, at decision block 69, that the altitude is not greater than assigned altitude for the heading, the system determines, at decision block 73, if the altitude is less than the assigned altitude for the heading. If so, the system actuates a low altitude alarm, at block 75, and processing returns to block 51.

Figure 8:
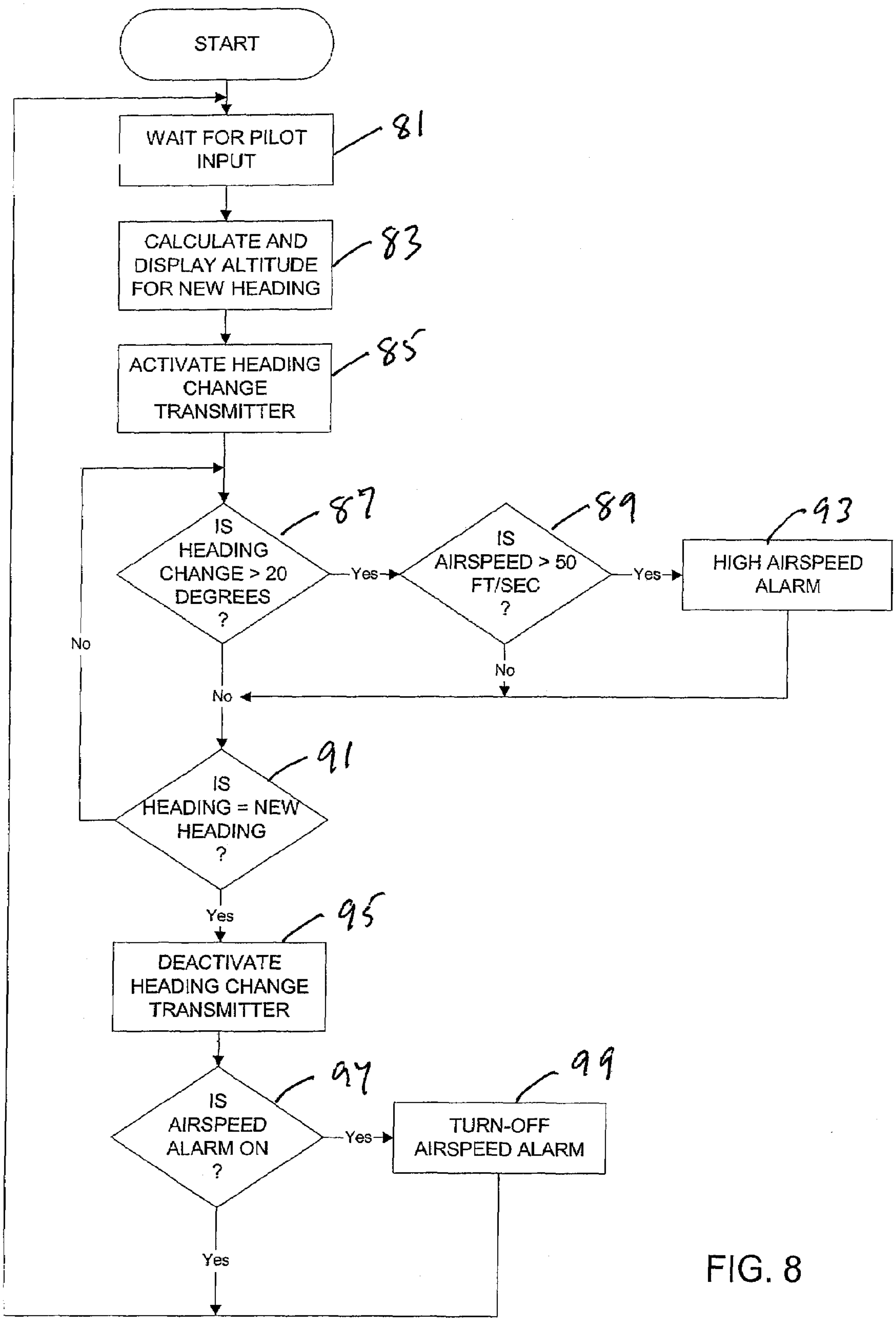
FIG. 8 is a flowchart heading change processing according to an embodiment of a system according to the present invention.

Referring now to FIG. 8, there is shown a flowchart of turn processing according to an embodiment of a system of the present invention. The system waits for pilot input, which includes specifying a new heading, at block 81. Then, the system calculates and displays the assigned altitude for the new heading, at block 83. Then, the system actuates the heading change transmitter, at block 85. After actuating the heading change transmitter, the system determines, at decision block 87, if the heading change requires a turn of greater than twenty degrees, taking into account the turning rules described with respect to FIG. 1. If a turn greater than twenty degrees in required, the system determines, at decision block 89, if the airspeed is greater than fifty feet per second. If not, the system determines, at decision block 91, if the current heading is equal to the new heading. If, at decision block 89, the airspeed is greater than fifty feet per second, the system actuates the high airspeed alarm, at block 93, and processing continues at decision block 91. If the current heading is not equal to the new heading, as determined at decision block 91, processing returns to decision block 87. When the PAV reaches the new heading, the system deactivates the heading change transmitter, at block 95, and determines if the airspeed alarm is on, at decision block 97. If so, the system turns off the airspeed alarm, at block 99, and processing returns to block 81 to await pilot input.

Figure 9:
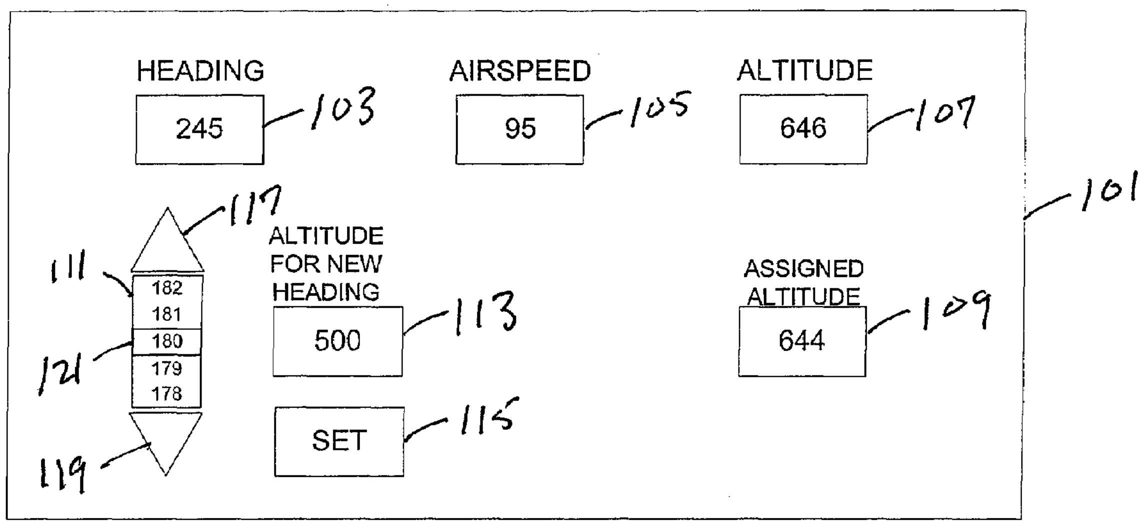
FIG. 9 is illustrates a display of an embodiment of a system according to the present invention.

Referring now to FIG. 9, there is illustrated an embodiment of an instrument display 101 according to the present invention. Display 101 includes a heading indicator 103, which displays the current heading, an airspeed indicator 105, which displays the current airspeed, and an altitude indicator 107, which displays the current altitude above the ground. Display 101 may also include an assigned altitude indicator 109, which displays the assigned altitude above the ground for the current heading.

Display 101 may also include a new heading and altitude calculation display, which includes a new heading selector display 111, an altitude indicator 113 for the new heading, and a set new heading control 115. Display 101 may be implemented as touch screen device. New heading selector display 111 may include scroll controls 117 and 119, which may be operated to scroll headings up and down in indicator 111. A new heading is set by actuating set control 115. The heading displayed in box 121 of selector display 111 when set control 115 is actuated is the new heading. The system calculates the altitude for the new heading, which altitude is displayed in indicator 113.

From the foregoing it may be seen that embodiments of the present invention provide safe and effective methods and systems for controlling PAV traffic. The present invention has been described with respect to examples of embodiments. Those skilled in the art will recognize alternative embodiments. Certain features of the disclosed embodiments may be implemented independently of, or in combination with, other features. It should be recognized that the description of the embodiments of the invention are for purposes of illustration rather than limitation.

What is claimed is:

1. A computer-implemented method of controlling a personal air vehicle, flown at altitudes below general aviation traffic without assistance from air traffic controllers, comprising:

providing a processor programmed with flight control rules for the personal air vehicle to assist in avoiding a collision with other personal air vehicles, the flight control rules requiring:

that when the personal air vehicle is operating in a take-off-and-landing zone between a ground altitude and a first altitude that the personal air vehicle be flown between a first minimum airspeed and a first maximum airspeed but not requiring the personal air vehicle to fly at a unique altitude for every different heading of the personal air vehicle; and that when the personal air vehicle is operating in a forward flight zone between the first altitude and a second altitude that the personal air vehicle be flown between a second minimum airspeed and a second maximum airspeed and also requiring the personal air vehicle to fly at the unique altitude for said every different heading of the personal air vehicle;

and flying the personal air vehicle using the programmed flight control rules.

2. The method as claimed in claim 1, wherein the first maximum airspeed in said take-off-and-landing zone is equal to the second minimum air speed in said forward flight zone.

3. The method as claimed in claim 1, wherein said first minimum airspeed is about 0 miles per hour and said first maximum airspeed is about twenty-five miles per hour.

4. The method as claimed in claim 1, wherein said second minimum airspeed is about twenty-five miles per hour and said second maximum airspeed is about one hundred miles per hour.

5. The method as claimed in claim 1, wherein said forward flight zone is at a higher altitude than said take-off-and-landing zone.

6. The method as claimed in claim 1, wherein said ground altitude is zero and said first altitude is about two hundred feet above the ground altitude.

7. The method as claimed in claim 1, wherein said first altitude is about two hundred feet and said second altitude is about one thousand feet.

* * * * *